US005304770A

United States Patent [19]

Takabayashi

[11] Patent Number: 5,304,770

[45] Date of Patent: Apr. 19, 1994

[54] NOZZLE STRUCTURE FOR PLASMA TORCH

[75] Inventor: Yuichi Takabayashi, Hiratsuka, Japan

[73] Assignee: Kabushiki Kaisha Komatsu Seisakusho, Tokyo, Japan

[21] Appl. No.: 62,071

[22] Filed: May 14, 1993

[51] Int. Cl.[5] .......... B23K 9/00; B23K 10/00

[52] U.S. Cl. .......... 219/121.5; 219/121.48; 219/75

[58] Field of Search .......... 219/121.48, 121.5, 121.51, 219/74, 75, 121.37

[56] References Cited

U.S. PATENT DOCUMENTS

| | | | |
|---|---|---|---|
| 3,242,305 | 3/1966 | Kane et al. | 219/121.5 |
| 3,632,951 | 1/1972 | Klasson et al. | 219/75 |
| 4,579,282 | 4/1986 | Navara et al. | 219/121.5 |
| 4,959,520 | 9/1990 | Okada et al. | 219/121.48 |
| 5,013,885 | 5/1991 | Carkhuff et al. | 219/121.5 |

FOREIGN PATENT DOCUMENTS

| | | |
|---|---|---|
| 2-35413 | 9/1990 | Japan . |
| 4-108976 | 9/1992 | Japan . |

*Primary Examiner*—Mark H. Paschall
*Attorney, Agent, or Firm*—Richards, Medlock & Andrews

[57] ABSTRACT

A plasma torch is provided with a sharply converging nozzle which can prevent the lower end of the torch from making contact with a workpiece which has concavities and convexities during the cutting of the workpiece with the plasma torch. An upper portion (1*a*) of the nozzle (1) is provided with an outwardly directed flange (1*h*) so as to make close contact with a seat surface (2*d*) formed in the inner periphery of the lower portion of the cap (2), so as to ensure electrical conduction between the nozzle (1) and the cap (2) and to secure to a torch body (8) the nozzle (1) and components (3, 4, 5) contained in the nozzle (1). O-rings (6, 6*a*, 9) provide seals for the cooling water passage (7). The lower end of cylindrical portion (1*a*) of the nozzle (1) below the flange (1*f*), as well as the conical portion (1*b*), constitutes part of the exterior surface of the plasma torch, while the apex angle ($\theta_1$) of the nozzle structure is made smaller so that the nozzle structure is more sharply tapered.

18 Claims, 1 Drawing Sheet

NOZZLE STRUCTURE FOR PLASMA TORCH

FIELD OF THE INVENTION

The present invention relates to an improvement in a plasma torch adapted to be used in a plasma cutter.

BACKGROUND OF THE INVENTION

A nozzle structure attached to the lower end of a conventional plasma torch, as shown in FIG. 2, comprises a nozzle 10, an annular insulation member 30, an annular swirler 40, and an electrode 50. The nozzle 10 has an upper cylindrical portion, a frustoconical portion, a lower cylindrical portion and a projecting conical lower end portion with an end face, forming an interior chamber. The end face of the nozzle 10 has a hole therein in communication with the interior chamber of the nozzle 10 for confining a plasma jet. The swirler 40 is positioned within the interior chamber of the nozzle 10, resting on the shoulder between the upper cylindrical portion and the frustoconical portion of the nozzle 10. The electrode 50 is positioned by the swirler 40 and the insulation cylinder 30 to be coaxial with the nozzle 10. The swirler 40 jets working gas in the form of a swirl steam or an axial stream into an annular gap between the electrode 50 and the nozzle 10. A cap 20 has an upper cylindrical portion and a lower conical portion, with the lower conical portion having a hole centrally formed therein. The cap 20 is positioned about and coaxially with the nozzle 10 with the sides of the hole in the lower end of the cap 20 being in close contact with the conical surface of the lower conical portion of the nozzle 10, so that the outer surface of the nozzle 10 is encompassed by the cap 20, excepting only the lower end face of the nozzle 10. A space defined between the outer periphery of intermediate portions of the nozzle 10 and the inner periphery of the cap 20 serves as a passageway 70 for nozzle cooling water. The cylindrical portion of the cap 20 is secured to the cylindrical portion of the torch body 80 by suitable means.

The cap 20 serves the function of securing to the torch body 80 the nozzle 10 and the components fitted therein, as well as ensuring electrical conduction to the nozzle 10. In such a plasma torch in which the nozzle 10 is directly cooled by water, the cap 20 also serves the function of sealing the cooling water passageway 70 so as to prevent the cooling water flowing around the outer periphery of the nozzle 10 from leaking out of the torch.

In order to achieve these functions effectively, the cap 20 is made to have metal-to-metal contact with the nozzle 10 in the vicinity of the lower (front) end of the plasma torch, and the diameter of the cylindrical portion of the cap 20 and the apex angle $\theta_2$ of the conical portion of the cap 20 are both made to be large. The large diameter of the cylindrical portion of the cap 20 and the large apex angle of the conical portion of the cap 20 readily accommodate the various components positioned in the vicinity of the front end of the plasma torch, e.g., the insulation cylinder 30 fitted on the outer periphery of the electrode 50, the swirler 40 attached to the lower end of the insulation cylinder 30, the nozzle 10 in which these components are fitted, and the like.

Such a plasma cutter can be used in two-dimensional cutting of a workpiece such as a flat plate, and can also be used in three dimensional cutting, e.g., for forming components of automobiles or the like by installing the plasma cutter onto a robot. However, the conventional plasma torch having a large diameter cap and a large apex angle $\theta_2$ at the lower end of the torch has incurred the following problems.

(1) If the height of the plasma torch (the distance between the lower surface of the nozzle 10 and the cutting surface on the workpiece) is set to a predetermined desired value, the sides of the lower end of the torch can sometimes make contact with the workpiece when the cutting is being conducted in a trough-like recess in the workpiece. Accordingly, it is not always safe for the height of the torch to be maintained at the predetermined desired value. That is, the accessibility of the plasma torch is inferior due to the size and shape of the lower end of the nozzle structure. Where the cutting has to be made with a torch height greater than the predetermined desired height, the cutting quality at that location can be extremely poor, and in some cases no cutting can be made.

(2) During a robotic teaching work wherein cutting loci are being stored in memory in a robot, a marking line made on the workpiece to be cut can be hidden by the torch so that the teaching work becomes difficult.

(3) Since the portion of the cap 20 which contacts the nozzle 10 is in close proximity to the lower end of the nozzle 10, molten metal which splatters during a cutting operation can contact the cap 20 and adhere thereto. Thus, an abnormal electric discharge or a double arc point is likely to occur. Accordingly, damage to the cap 20 can occur, thereby causing leakage of cooling water through the metal-to-metal seal between the nozzle 10 and the cap 20.

SUMMARY OF THE INVENTION

One object of the present invention is to provide a sharply convergent nozzle for a plasma torch which, without changing the basic structure of the conventional torch, can solve the above-mentioned problems (1), (2) and (3) inherent in the conventional torch.

In order to achieve the foregoing object according to the present invention, the nozzle structure is provided with a novel plasma torch nozzle and cap construction. The plasma torch nozzle has an upper portion and a lower converging portion, the lower portion having its lower end formed with a small hole for jetting a plasma arc while the nozzle surrounds an electrode. The upper portion of the nozzle is provided with an outwardly directed flange formed at the outer periphery of the upper portion of the nozzle, with the lower surface of the flange being in close contact with a seat surface formed at the inner periphery of the lower end portion of the cap. A gap between the outer periphery of the upper portion of the nozzle and the inner periphery of the lower end portion of the cap is sealed by suitable means, e.g., an O-ring, at a location below the seat surface of the cap, while part of the upper portion of the nozzle extends below the lower end of the cap and, along with the lower converging portion of the nozzle, forms part of the exterior surface of the plasma torch.

With this arrangement, the plasma torch cap, with which the nozzle has been conventionally covered in its entirety excepting only a part of the lower end portion thereof, is retracted rearwardly so that the length of the nozzle exposed to the outside of the plasma torch, measured from the lower tip of the nozzle to the lower end of the cap, is made longer and the apex angle of the nozzle structure is made smaller so that the lower portion of the plasma torch is sharply tapered, thereby reducing the possibility that the lower end portion of the plasma torch makes contact with the workpiece being cut, even though the workpiece has concavities and convexities. With the use of the sharply convergent nozzle structure, a marking line, depicted on the workpiece to be cut, can be easily seen in comparison with the conventional torch, thereby facilitating a teaching work for a robot. Further, since a gap between the nozzle and the cap is sealed at a position which is substantially above the lower end of the torch, the sealability of the nozzle structure for the nozzle cooling water can be enhanced and maintained.

DETAILED DESCRIPTION OF THE INVENTION

Figure 1:
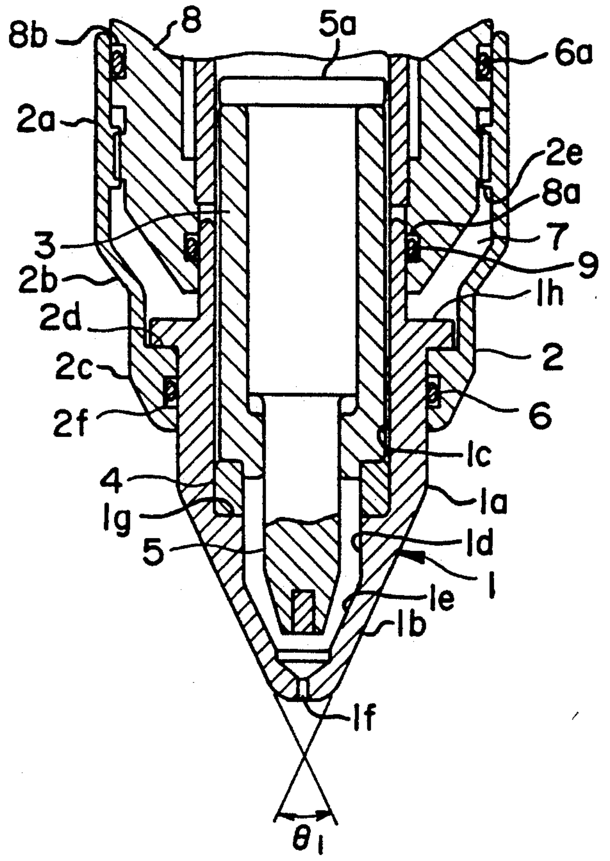
FIG. 1 is an elevational view in cross section illustrating the lower portion of a plasma torch having a sharply convergent nozzle structure in accordance with the present invention.

A preferred embodiment of a sharply convergent nozzle for a plasma torch according to the present invention is illustrated in FIG. 1, and comprises a nozzle 1, a cap 2, an insulating sleeve 3, a swirler 4, an electrode 5, and a torch body 8, each of which has a circular cross section in a plane perpendicular to the longitudinal axis of the plasma torch.

The plasma torch nozzle 1 is an annular member having an upper cylindrical portion 1*a* and a lower conical portion 1*b*, forming an internal chamber comprising an upper cylindrical chamber portion 1*c*, an intermediate cylindrical chamber portion *id*, and a lower conical chamber portion 1*e* connected in series, with the diameter of the intermediate cylindrical chamber portion 1*d* being less than the diameter of the upper cylindrical chamber portion 1*c*, thereby forming an interior, upwardly facing annular shoulder 1*g* at the joindure of the upper chamber portion 1*c* and the intermediate chamber portion 1*d*. The lower conical portion 1*b*, which converges downwardly and inwardly, has a small hole 1*f* formed in its end face in communication with the lower chamber portion 1*e* for jetting a plasma arc outwardly from the plasma torch and towards a workpiece to be cut.

The annular swirler 4, having an axial length substantially less than the axial length of the upper cylindrical chamber portion 1*c* and a diameter which is only slightly smaller than the diameter of the bottom portion of the upper cylindrical chamber portion 1*c*, is positioned within the upper cylindrical chamber portion 1*c* with the swirler 4 being supported by the interior annular shoulder 1*g*.

At least the lower portion of the annular insulating sleeve 3, having a diameter which is slightly smaller than the diameter of the upper cylindrical chamber portion 1*c*, is positioned within the upper cylindrical chamber portion 1*c*, with the annular insulating sleeve being supported by the swirler 4.

The electrode 5 is positioned within the cavity of the insulating sleeve 3, with the lower portion of electrode 5 projecting downwardly from the lower end of the insulating sleeve 3. The upper end of electrode 5 has an outwardly extending annular flange 5*a* having a diameter which is greater than the diameter of the cavity within insulating sleeve 3 while the diameter of the remainder of the electrode 5 is smaller than the diameter of the corresponding portion of the cavity within the insulating sleeve 3 such that the flange 5*a* rests on the upper end of the sleeve 3, thereby suspending the electrode 5 in a position such that the insulating sleeve 3 surrounds and is coaxial with the upper portion of the electrode 5 below the flange 5*a* while the nozzle 1 surrounds and is coaxial with the lower portion of the insulating sleeve 3 and the portion of the electrode 5 which projects downwardly from the lower end of the insulating sleeve 3.

The upper end of the electrode 5, the upper end of the insulating sleeve 3 and the upper end of nozzle 1 are positioned within the lower end of the annular body 8 of the plasma torch, with a suitable sealing means being provided between the interior surface of the annular body 8 and the exterior surface of the upper end of nozzle 1. One such suitable sealing means is an O-ring 9 positioned within an annular groove 8*a* located in the interior surface of the annular body 8.

The upper cylindrical portion 1*a* of the nozzle 1 has an annular flange 1*h* extending radially outwardly from the outer periphery of the remainder of the upper cylindrical portion 1*a*, at a location which is below the lower end of the torch body 8, such that the flange 1*h* has a lower surface which faces downwardly.

A cap 2 has an upper annular portion 2*a*, an intermediate annular portion 2*b*, and a lower annular portion 2*c*, with the inner diameter of the lower portion 2*c* being smaller than the inner diameter of the intermediate portion 2*b* so as to form an upwardly facing annular shoulder 2*d* at the joindure of cap portions 2*b* and 2*c*. The annular shoulder 2*d* serves as a seat surface to closely contact and support the lower surface of the flange 1*h* of the nozzle 1, the diameter of the flange 1*h* being greater than the inner diameter of the lower cap portion 2*c* and slightly less than the inner diameter of intermediate cap portion 2*b*.

The upper cap portion 2*a* is provided with suitable means 2*e* for securing the cap 2 to the torch body 8 so as to provide an annular gap 7 between the inner periphery of the intermediate cap portion 2*b* and the outer periphery of the adjacent portion of the nozzle 1 for the circulation of cooling water therethrough to control the temperature of the nozzle 1 during operation of the plasma torch. The securing means 2*e* can be in the form of internal threads on the interior of cap 2 mating with external threads on the exterior of the torch body 8, mating portions of a bayonet lock joint, mating snap fitting portions, or the like. The cooling water passageway 7 is sealed by suitable means, e.g., an O-ring 6 can be located in an annular groove 2*f* formed in the inner surface of the lower cap portion 2*c*, i.e., at a location below the seat surface 2*d* of the cap 2, to provide a seal between the cap 2 and the nozzle 1, while an O-ring 6*a* can be provided in an annular groove 8*b* formed in the exterior surface of torch body 8. The O-ring 6*a* can be located either above or below the securing means 2*e*, so long as it provides a seal between the cap 2 and the torch body 8. The O-ring 6, fitted in the groove 2*f*, makes close contact with the outer periphery of the nozzle 1 below the flange 1*h*, while the O-ring 6*a*, fitted in groove 8*b*, makes close contact with the inner periphery of the cap 2, so as to make fluid-tight seals against leakage of cooling water flowing through the nozzle cooling water passage 7.

The intermediate cap portion 2*b* preferably contains a downwardly and inwardly converging frustoconical section in order to readily accommodate both the large diameter of the torch body 8 and the smaller diameter of the cylindrical portion 1*a* of nozzle 1. The lower section of the cylindrical portion 1*a* of the nozzle 1, as well as the conical portion 1*b* of the nozzle 1, extends below the lowermost end of cap 2, thereby forming part of the exterior surface of the plasma torch. It is presently preferred that the exterior surface of at least about half of the axial length of the nozzle 1 constitutes exterior surface of the plasma torch when the plasma torch is in operation. In the embodiment illustrated in FIG. 1, the exterior surface of over half of the axial length of the nozzle 1 constitutes exterior surface of the plasma torch when the plasma torch is in operation.

The lower surface of the flange 1*h* conforms to the seat surface *2d*, formed in the inner periphery of the cap 2, and is positioned in close contact with the seat surface *2d* so as to ensure adequate electrical conduction between the nozzle 1 and the cap 2 and to securely position with respect to the torch body 8 the nozzle 1 and the components which are fitted in the nozzle 1, such as the insulation sleeve 3, swirler 4, electrode 5, and the like.

The outer diameter of the upper cylindrical portion 1*a* of the nozzle 1 can be larger than the outer diameter of the conventional nozzle 10 since the wall thickness of the part of the cylindrical portion 1*a* between the flange 1*h* and the conical portion 1*b* can be made to be larger than the wall thickness of the conventional nozzle 10. The wall thickness of the part of the cylindrical portion 1*a* above the flange 1*h* can be substantially less than the wall thickness of the part of the cylindrical portion 1*a* below the flange 1*h*, thereby facilitating the insertion of the upper end of the nozzle 1 into the torch body 8.

Thus, a part of the functions which have been previously associated with the lower end portion of the nozzle 10 has been shifted to the upper portion 1*a* of the nozzle 1, so that a part of the exterior surface of the upper portion of nozzle 1 is below the cap 2 and is exposed to the atmosphere as part of the exterior surface of the plasma torch, while the apex angle $\theta_1$ of the exposed conical portion 1*b* of the nozzle 1 can be made smaller. Accordingly, the diameter of the lower end part of the plasma torch becomes smaller while the shape thereof converges downwardly to the end face of the nozzle at a sharper angle than in the conventional plasma torch. For example, the apex angle $\theta_1$ of the conical part of the nozzle 1, and thus of the lower end part of the plasma torch, can be less than 60° and preferably less than about 50°, which should be compared with the conventional plasma torch of FIG. 2 in which the apex angle $\theta_2$ has been set as $\theta_2 = 70°$.

With the provision of the flange 1*h* and with an increase in the wall thickness of the cylindrical part of the nozzle 1 below the flange 1*h*, the thermal conductivity of the nozzle 1 can be increased. Since the portion of the nozzle 1 exposed to the surrounding atmosphere is increased, the cooling ability of the nozzle 1 can be enhanced. Accordingly, no overheating of the nozzle 1 is encountered even though the only portion of the nozzle 1 contacted by the cooling water is that portion which extends upwardly from the lower surface of the flange 1*h*.

With the above described improvement, the lower end of the torch 1 can avoid making contact with a workpiece to be cut, even in a part of the workpiece where a trough-like recess is formed. Accordingly a workpiece which has had to be conventionally cut with a torch height larger than a predetermined desired value can now be cut with the predetermined desired torch height being maintained. With this arrangement, the possible cutting range can be enlarged while the quality of cutting can be enhanced remarkably.

Further, with the present invention it is possible to facilitate the observation of a marking line on a workpiece to be cut during a teaching work of determining cutting loci for a robot in comparison with the use of a conventional plasma torch, and accordingly, the degree of accuracy for the teaching work and the working efficiency can be enhanced.

Figure 2:
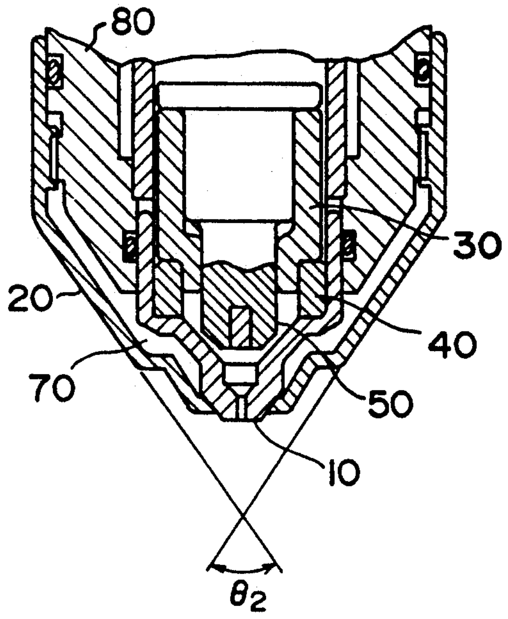
FIG. 2 PRIOR ART
FIG. 2 is an elevational view in cross section illustrating the lower portion of a conventional plasma torch.

Since the nozzle contacting portion of the conventional cap 20 as shown in FIG. 2 is in close proximity to the lower end of the nozzle 10, adhesion of molten metal to the cap 20 during a cutting operation or abnormal electric discharge or a double arc point has been likely to occur. Accordingly, nonuniformity of product can result from damage to the cap 20 which results in leakage of water. Thus, the frequency of replacement of a cap 20 with a new one, has been high. On the contrary, with the sharply convergent torch 1 according to the present invention, the nozzle contacting portion of the cap 2 is far away from the lower end of the nozzle 1, and is at a position where the cap 2 is hidden from molten metal which splatters during a cutting operation. Thus, damage to the cap 2 is avoided, and it can be used permanently. Further, since the lower end of the cap 2 is remote from the lower end of the nozzle 1, an O-ring 6 can be used to provide the seal between the cap 2 and the nozzle 1 for the cooling water passageway 7 so that leakage of water through the nozzle structure never occurs. Thus, the sealing ability is enhanced in comparison with the conventional plasma torch in which the sealing between the nozzle 10 and the cap 20 has been achieved by a metal-to-metal contact structure.

While the nozzle structure of FIG. 1 has been described in terms of elements having circular cross sections perpendicular to the longitudinal axis of the nozzle structure, elements having other configurations can also be employed, e.g., the cross section of the elements can be generally circular, generally oval, generally rectangular, generally hexagonal, etc. Elements having an at least generally cylindrical configuration are presently preferred. The directional reference terms "up", "down", "upper", "lower", and the like, are used herein with reference to FIG. 1 and do not require the plasma torch to be positioned vertically with the tip of the nozzle pointing towards the ground during the operation of the plasma torch. Other reasonable variations and modifications are possible within the scope of the foregoing description, the drawings and the appended claims to the invention.

I claim:

1. A nozzle structure for a plasma torch, comprising:
   - an electrode having an upper portion and a lower portion;
   - an annular nozzle having an upper portion and a lower portion, with the lower portion of said nozzle converging downwardly and inwardly, said nozzle surrounding at least the lower portion of said electrode, the lower portion of said nozzle having a lower end containing a hole formed therein for jetting a plasma arc outwardly from the plasma torch, said upper portion of said nozzle having a flange extending outwardly therefrom, said flange having a lower surface which faces downwardly; and an annular cap having an upper portion and a lower portion, said lower portion of said cap having a lower end and an upper end with an upwardly facing internal shoulder formed at the upper end of the lower portion of said cap, wherein said cap surrounds an upper part of the upper portion of said nozzle with said lower surface of said flange being in close contact with said upwardly facing internal shoulder of said cap;

wherein a lower part of said upper portion of said nozzle extends downwardly beyond the lower end of said lower portion of said cap so that said lower part of said upper portion of said nozzle, along with said lower portion of said nozzle, form a portion of exterior surface of the plasma torch when the plasma torch is in operation such that the portion of exterior surface of the plasma torch formed by said lower portion of said nozzle defines an apex angle for the nozzle structure of less than about 60°.

2. A nozzle structure in accordance with claim 1, wherein said upper portion of said nozzle has an at least generally cylindrical configuration, and said lower portion of said nozzle has an at least generally conical configuration.

3. A nozzle structure in accordance with claim 1, wherein the nozzle structure has an apex angle of less than about 50°.

4. A nozzle structure in accordance with claim 1, wherein said cap and said nozzle are shaped so as to form a gap between the outer periphery of the upper part of said upper portion of said nozzle and the adjacent inner peripheral of said cap, whereby a cooling fluid can be passed through said gap.

5. A nozzle structure in accordance with claim 4, wherein said lower portion of said cap has an annular groove formed in the interior surface thereof below said internal shoulder, and wherein an O-ring is positioned in said annular groove in close contact with the exterior surface of said nozzle to thereby form a seal between said cap and said nozzle.

6. A nozzle structure in accordance with claim 1, wherein said nozzle has an internal upwardly facing shoulder, and further comprising an annular swirler positioned between said electrode and said nozzle and supported by the internal upwardly facing shoulder of said nozzle.

7. A nozzle structure in accordance with claim 6 further comprising an annular insulating sleeve positioned between the upper portion of said electrode and the upper portion of said nozzle and supported by said swirler.

8. A nozzle structure in accordance with claim 1, wherein the exterior surface of ever half of the axial length of the nozzle constitutes exterior surface of the plasma torch when the plasma torch is in operation.

9. A nozzle structure in accordance with claim 8, wherein the nozzle structure has an apex angle of less than about 50°.

10. A nozzle structure in accordance with claim 9, wherein said upper portion of said nozzle has an at least generally cylindrical configuration, and said lower portion of said nozzle has an at least generally conical configuration.

11. A nozzle structure in accordance with claim 10, where said cap and said nozzle are shaped so as to form a gap-between the outer periphery of the upper part of said upper portion of said nozzle and the adjacent inner periphery of said cap, whereby a cooling fluid can be passed through said gap.

12. A nozzle structure in accordance with claim 11, wherein said lower portion of said cap has an annular groove formed in the interior surface thereof below said internal shoulder, and wherein an O-ring is positioned in said annular groove in close contact with the exterior surface of said nozzle to thereby form a seal between said cap and said nozzle.

13. A nozzle structure in accordance with claim 12, wherein said nozzle has an internal upwardly facing shoulder, and further comprising an annular swirler positioned between said electrode and said nozzle and supported by the internal upwardly facing shoulder of said nozzle.

14. A nozzle structure in accordance with claim 13, further comprising an annular insulating sleeve positioned between the upper portion of said electrode and the upper portion of said nozzle and supported by said swirler.

15. A plasma torch, comprising:

a plasma torch body;

an electrode having an upper portion and a lower portion;

an annular nozzle having an upper portion and a lower portion, with the lower portion of said nozzle converging downwardly and inwardly, said nozzle surrounding at least the lower portion of said electrode, the lower portion of said nozzle having a lower end containing a hole formed therein for jetting a plasma arc outwardly from the plasma torch, said upper portion of said nozzle having a flange extending outwardly therefrom, said flange having a lower surface which faces downwardly, said nozzle having an internal upwardly facing shoulder;

an annular swirler positioned between said electrode and said nozzle and supported by the internal upwardly facing shoulder of said nozzle;

an annular insulating sleeve positioned between the upper portion of said electrode and the upper portion of said nozzle and supported by said swirler; and an annular cap having an upper portion and a lower portion, said lower portion of said cap having a lower end and an upper end with an upwardly facing internal shoulder formed at the upper end of the lower portion of said cap;

wherein the upper end of said nozzle is positioned within the interior of said plasma torch body, wherein said cap surrounds an upper part of the upper portion of said nozzle with said lower surface of said flange being in close contact with said upwardly facing internal shoulder of said cap, wherein said upper portion of said cap is secured to said plasma torch body, wherein a lower part of said upper portion of said nozzle extends downwardly beyond the lower end of said lower portion of said cap so that said lower part of said upper portion of said nozzle, along with said lower portion of said nozzle, form a portion of exterior surface of the plasma torch when the plasma torch is in operation such that the portion of exterior surface of the plasma torch formed by said lower portion of said nozzle defines an apex angle for the plasma torch of less than about 60°.

16. A plasma torch in accordance with claim 15, wherein the plasma torch has an apex angle of less about 50°.

17. A plasma torch in accordance with claim 16, where said cap and said nozzle are shaped so as form a gap between the outer periphery of the upper part of said upper portion of said nozzle and the adjacent inner periphery of said cap, wherein said lower portion of said cap has an annular groove formed in the interior surface thereof below said internal shoulder, and wherein an O-ring is positioned in said annular groove in close contact with the exterior surface of said nozzle to thereby form a seal between said cap and said nozzle, whereby a cooling fluid can be passed through said gap.

18. A plasma torch in accordance with claim 17, wherein the exterior surface of at least about half of the axial length of the nozzle constitutes exterior surface of the plasma torch when the plasma torch is in operation.

* * * * *

UNITED STATES PATENT AND TRADEMARK OFFICE

CERTIFICATE OF CORRECTION

PATENT NO. : 5,304,770

DATED : April 19, 1994

INVENTOR(S) : Yuichi TAKABAYASHI

It is certified that error appears in the above-indentified patent and that said Letters Patent is hereby corrected as shown below:

Column 7, line 34, delete "peripheral" and insert --periphery--.

Column 7, line 55, delete "even" and insert --over--.

Column 7, line 66, delete "gap-between" and insert --gap between--.

Column 9, line 2, after "less", insert --than--.

Signed and Sealed this

Sixth Day of September, 1994

Attest:

Bruce Lehman

BRUCE LEHMAN

*Attesting Officer* *Commissioner of Patents and Trademarks*